United States Patent [19]

Beekman et al.

[11] Patent Number: 5,332,772
[45] Date of Patent: Jul. 26, 1994

[54] COMBINATION HEAT STABILIZER/LUBRICANT FOR PVC PROCESSING AND METHOD FOR PRODUCING THE SAME

[75] Inventors: George F. Beekman, Middletown; Lionel R. Price; Keith A. Mesch, both of Cincinnati, all of Ohio

[73] Assignee: Morton International, Inc., Chicago, Ill.

[21] Appl. No.: 57,724

[22] Filed: May 5, 1993

[51] Int. Cl.$^5$ .................................................. C08K 5/36
[52] U.S. Cl. .................... 524/301; 524/400; 556/130; 556/131
[58] Field of Search ............... 524/361, 400; 556/130, 556/131; 554/157

[56] References Cited

U.S. PATENT DOCUMENTS

| | | | |
|---|---|---|---|
| 2,939,898 | 6/1960 | Aron | 260/752 |
| 2,963,434 | 12/1960 | Millikan et al. | 252/42.7 |
| 3,067,166 | 12/1962 | Zaremsky | 524/302 |
| 3,647,834 | 3/1972 | Martin | 260/429.9 |
| 3,803,188 | 4/1974 | Scott et al. | 554/157 |
| 4,251,451 | 2/1981 | Magee et al. | 554/157 |
| 4,269,731 | 5/1981 | Mack | 556/77 |
| 4,279,806 | 7/1981 | Muldrow | 556/77 |
| 4,287,118 | 9/1981 | Muldrow | 556/77 |
| 4,303,578 | 12/1981 | Michaelis | 556/77 |
| 4,396,552 | 8/1983 | Knobloch et al. | 556/130 |
| 4,404,408 | 9/1983 | Wirth et al. | 556/130 |
| 4,515,916 | 5/1985 | Molt | 524/99 |
| 4,755,549 | 7/1988 | Kemper et al. | 524/301 |

FOREIGN PATENT DOCUMENTS

| | | |
|---|---|---|
| WO91/19691 | 12/1991 | European Pat. Off. . |
| 160413 | 7/1983 | Fed. Rep. of Germany . |
| 50-80451 | 7/1975 | Japan . |
| 0413854 | 9/1978 | U.S.S.R. . |

*Primary Examiner*—Veronica P. Hoke
*Attorney, Agent, or Firm*—Robert M. Didrick; Gerald K. White

[57] ABSTRACT

The preparation of a zinc mercaptoacid ester by the reaction of zinc oxide with the mercaptoacid ester in a wax matrix provides an improved heat stabilizer for halogen-containing polymer compositions. The process obviates the necessity of isolating and transporting the normally very viscous zinc mercaptoacid esters. The zinc mercaptoacid ester/wax matrix is also an expedient medium for the preparation and utilization of calcium stearate as a lubricant in the heat stabilizer composition and the stabilized polymer composition containing it. A paraffin wax is the preferred matrix for the preparation and use of the heat stabilizer and lubricant.

6 Claims, No Drawings

COMBINATION HEAT STABILIZER/LUBRICANT FOR PVC PROCESSING AND METHOD FOR PRODUCING THE SAME

BACKGROUND OF THE INVENTION

Halogen containing polymers, especially those containing chlorine, are used widely and have great commercial significance. Polyvinyl chloride (PVC), in particular, is used in packaging, siding, pipe, and many extruded shapes. Such large scale and diverse use of the halogen-containing polymers depends upon the incorporation therein of good heat and light stabilizers. PVC, for example, is known to have a tendency to degrade upon prolonged exposure to heat and light during processing and use. Darkening or other color change and the loss of tensile, flexural, and impact strengths are the results of such degradation. Unless good low-cost stabilizers are available for addition to the polymer composition, the service life of articles made from the composition will be limited, and its use severely restricted, as will be the conditions for making it.

One particularly troublesome form of degradation occurs when the polymer composition is processed into articles by methods employing heat to melt or soften the polymer. A color change can occur during the first few minutes at high temperatures (e.g., from about 175° to about 200° C.) and it is commonly referred to as early color or early discoloration. The avoidance of such early color is notably important in the manufacture of plastic pipe and siding. It is, of course, also important to prevent or reduce discoloration and deterioration of the polymer during extended exposure to high temperatures, which can lead to sudden and catastrophic degradation into a pitch-like abrasive material and cause the formation of corrosive materials such as HCl inside the fabricating equipment. The inner, highly polished surfaces of the equipment can thus be rendered essentially useless.

Attempts have been made to replace organo-tin stabilizers at least in part with other organo-metal compounds such as zinc mercaptoesters. The complete replacement of organo-tin compounds by zinc mercaptoesters such as $[C_8H_{17}OC(=O)CH_2S]_2Zn$ in combination with alkali metal salts of organic acids is taught in Japanese Kokai 75 89451. In U.S. Pat. No. 4,515,916, Molt teaches that a composition comprising a zinc mercaptoester, a basic inorganic alkali metal or alkaline earth metal compound, and, optionally, a substituted dihydropyridine is useful as a stabilizer for halogen-containing polymers.

SUMMARY OF THE INVENTION

It is an object of this invention to provide an improved method for the preparation of a zinc mercaptoester.

It is an object of this invention to eliminate the need to isolate a very viscous zinc mercaptoester that is difficult to move to and from a storage tank.

It is a related object to provide a non-volatile zinc mercaptoester/wax matrix which has a very low, water-like viscosity at 80° C.

It is an object of this invention to provide an improved heat stabilizer for halogen-containing polymer compositions.

It is an object of this invention to provide a halogen-containing polymer composition having improved heat stability.

It is a related object of this invention to provide a PVC composition having its extrusion properties improved by a novel lubricant/heat stabilizer.

These and other objects which will become apparent from the following description are achieved by a novel method for making the zinc mercaptoester. It is quite surprising that the new method by which the zinc mercaptoester is made not only obviates the necessity of isolating and transporting a very viscous product but also provides a product having a much improved performance as a heat stabilizer for halogen-containing polymer compositions. It is also quite gratifying that the resulting zinc mercaptoester/wax matrix serves as an expedient medium for the preparation and utilization of a lubricant for the processing of halogen-containing polymers.

The novel method of this invention for the preparation of a zinc mercaptoester comprises agitating a mixture of zinc oxide, a mercaptoester, and paraffin wax at a temperature at least equal to the melting range of the wax. Either the American or the French process zinc oxide is suitable. Any ratio of zinc oxide and mercaptoester will suffice so long as the reaction conditions are such as to drive the condensation of the sulfhydryl group of the ester and the oxygen atom of the zinc oxide and the splitting out of water but it is preferred to use a stoichiometric ratio of the reactants. A temperature higher than the melting point of the wax will be necessary for the removal of water at a practical rate at atmospheric pressure but under reduced pressure the reaction will proceed satisfactorily at from about 50° to about 80° C., the melting range for the wax. The maximum temperature is about 140° C.

Mercaptoesters useful in the method of this invention include those having the formula $HS-[CH_2C(=O)OR]_x(CH_2)_y-C(=O)OR$ wherein R is a straight or branched chain saturated alkyl radical having from 1 to 20 carbon atoms, and $x=0$ or 1, $y=1$ or 2, and $y=1$ when $x=1$.

Alkyl esters, as thus characterized, of mercaptoacetic (thioglycolic), β-mercapto-propionic, and mercaptosuccinic (thiomalic) acids exemplify mercaptoesters suitable for the method of this invention. The 2-ethylhexyl, iso-octyl, and n-octadecyl esters are preferable from the standpoint of the effectiveness of the heat stabilizers ultimately derived from them. Particularly preferred for that purpose are the iso-octyl and 2-ethylhexyl mercaptoacetates, iso-octyl mercaptopropionate, and the n-octadecyl mercaptoacetate and mercaptopropionate. All of these mercaptoesters are either available commercially or are easily made by conventional esterification procedures. The acids from which the esters are derived are also generally available commercially but may be made if so desired by procedures of long-standing in the chemical arts. Mercaptoacetic acid, for example, may be made by the reaction of sodium hydrosulfide with sodium chloroacetate and subsequent acidification. β-mercaptopropionic acid is obtained in about 80% yield from the reaction of sodium hydrosulfide with β-propiolactone in acetonitrile and subsequent acidification. Mercaptosuccinic acid may be made by adding hydrogen sulfide across the double bond of maleic anhydride followed by hydrolysis. Also suitable for the purposes of this invention are the alkyl esters of α-mercapto-propionic acid, which may be prepared from α-chloroproprionic acid and sodium thiosulfate according to the procedure described in U.S. Pat. No. 2,413,361, which is incorporated herein by reference. The alkyl esters may be made by conventional techniques. The respective zinc derivatives of the particularly preferred mercaptoesters are thus the preferred heat stabilizers in the compositions of this invention. Either French or American process zinc oxide is suitable for their preparation according to the method of this invention. Both are available in lead-free grades, which are preferable.

The waxes utilized in the present invention are low molecular weight hydrocarbon waxes including but not limited to polyethylene waxes, paraffin waxes, and microwaxes. In general, the useful hydrocarbon waxes have melting points from about 30° to about 90° C. Specific examples of these waxes include polyethylene waxes having melting points of about 38° to 50° C. and penetrations (ASTM D 1321) of 1 to 20; microwaxes having melting points of about 60° to about 90° C. and penetrations of 10 to 40; paraffin waxes having melting points of about 30° to aobut 60° C. and penetrations of 10 to 40. Blends of the foregoing waxes may also be used. Paraffin waxes are preferred.

The paraffin wax conveniently functions as the reaction matrix and as a lubricant in the final composition which will be processed in the manufacture of pipe and the like. It is generally a mixture of saturated hydrocarbons having from about 22 to about 30 carbon atoms and is obtained as a petroleum fraction. Waxes sold under the trademark Advawax ® 165 by Morton International, Inc. and under the trademark Hoechst XL 165 are suitable.

The paraffin wax, along with the zinc mercaptoester which has been made therein, may also function as a matrix for the in situ preparation of another lubricant useful in the compositions of this invention by adding calcium hydroxide and stearic acid to the matrix and heating it to form calcium stearate. Optionally, a partially oxidized polyethylene may be added to the mixture of wax and zinc mercaptoester before or after the reaction of the calcium hydroxide and stearic acid is complete. The temperature of the reaction mixture is from about 110° to about 126° C. The oxidized ethylene polymer also functions as a lubricant and it is exemplified by the Allied Chemical AC629A product.

Although the heat stabilizer of this invention is superior in performance to that taught in U.S. Pat. No. 4,515,916 even when the optional substituted dihydropyridine is used, the compositions of this invention may also contain said dihydropyridine as an optional component. As used herein, the term substituted dihydropyridine means a heterocyclic compound represented by the formula:

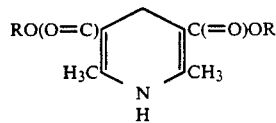

wherein R is the same or different saturated or unsaturated alkyl radical having from 1 to 20 carbon atoms in a straight or branched chain. Examples of particular substituted dihydropyridines which are suitable include those in which both R radicals are ethyl (referred to in the working examples hereinafter as DHP-1) or dodecyl (DHP-2). A method for the preparation of said dihydropyridines is taught in U.S. Pat. No. 4,209,439, which is incorporated herein by reference.

The halogen containing polymers which are stabilized by the stabilizer compositions of this invention and which are useful in the polymer compositions of this invention include, for example, halogenated polyolefin homopolymers, halogenated polyolefin copolymers, polymer blends containing a halogenated polyolefin homopolymer or copolymer, vinyl halide homopolymers, vinyl halide copolymers and polymer blends containing vinyl halide homopolymer or copolymers. As vinyl halide homopolymers, vinyl halide copolymers and polymer blends containing vinyl halide homopolymers or vinyl halide copolymers usable in the practice of this invention there, for example, may be used (1) polyvinyl chloride, there, for example, may be used (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate methyl acrylate, 2-ethylhexyl acrylate, butyl acryalate, ethyl acrylate, and other alkyl acrylates, methyl methacrylate, ethyl methacrylate, butyl methacrylate, hydroxyethyl methacrylate and other alky methacrylates, methyl alpha chloracrylate, styrene, vinyl ethers such as vinyl ethyl ether, vinyl chloroethyl ether, vinyl phenyl ether, vinyl ketones such as vinyl methyl ketone, vinyl phenyl ketone, 1 fluoro-1-chlorothelene, acrylonitrile, chloroacrylonitrile, allylidene diacetate, chloroallylidene diacetate, ethylene and propylene, and (3) pollnner blends such as blends of polyvinyl chloride and polyethylene, polyvinyl chloride and chlorinated polyethylene, polyvinyl chloride and polymethyl methacrylate, polyvinyl chloride and polybutylemethacrylate, polyvinyl chloride and polystyrene, polyvinyl chloride and acrylonitrile-butadiene-styrene copolymer, and polyvinyl chloride and polyetheylene and polymethy methacrylate. Typical vinyl halide copolymers usable in this invention include vinyl chloride-vinyl acetate (87:13), vinyl chloride-vinylidene chloride (95:5), vinyl chloridetrichloroethylene (95:5) and vinyl chloride-2-ethylhexyl acrylate (80:20). The polymer blends usable in the practice of this invention comprise physical blends of at least two distinct polymeric species and contain from 25 to 95 weight percent of vinyl halide homopolymer.

In addition to the halogen-containing polymer and the may contain conventional additives such as fillers, pigments, plasticizers, dyes, antioxidants, and ultraviolet light stabilizers. It may also contain lubricants other than those described above, such others being exemplified by stearyl stearate, cetyl palmitate, and other ester waxes. Materials such as calcined clays, calcium carbonate, and talcs may be used as fillers. Suitable pigments include titanium dioxide, carbon black, and iron oxide. Phthalates, sebacates, adipates, phosphates, and fatty esters having between 16 and 150 carbon atoms are representative of well known plasticizers suitable for the compositions of this invention. Suitable antioxidants include tricresyl phosphite; 2,6-di-t-butyl-4-methyl phenol; 2,6-di-t-butyl--4-decyoxy phenol; and 2-t-butyl-4-octadecyloxy phenol.

The stabilizer compositions of this invention are prepared by heating the paraffin wax to a temperature at which it becomes molten, adding the zinc oxide and the mercaptoester and heating the mixture to drive off water as it is formed by the condensation. A small amount, on the order of about 0.1% by weight of the zinc mercaptide product, of an organic acid may be used as an initiator for the reation. The condensation may be conducted at atmospheric pressure or at a reduced pressure. If unreacted zinc oxide remains, it may be removed from the reaction mixture by filtration or centrifugation. The product, rather than being so viscous as to be difficult to handle, has a very low viscosity at temperatures as low as about 80° C.

For the purposes of this invention, the stabilizer composition is defined to include the lubricants, whether made in situ or otherwise, because of their important effect on the stability of the polymer compositions during mastication and extrusion. Thus, the method of this invention also includes the addition of the the method of this invention also includes the addition of the lubricant to the wax matrix containing the zinc mercaptoester made therein.

The amount of each component in the stabilizer compositions may vary over a wide range. Generally, however, the stabilizer compositions comprise from about 5% to about 85%, preferably from about 10% to about 20%, of the zinc mercaptoester made by the method of this invention, from about 15% to about 80% of the paraffin wax, from 0 to about 20% of the calcium stearate, and, when used, from about 1% to about 20%, preferably from 5 to about 10%, of the substituted dihydropyridine, all percentages being by weight based on the total weight of the stabilizer composition.

Likewise, the amount of the stabilizer composition employed in the polymer compositions of this invention may vary over a wide range. An effective amount is, of course, all that is needed. In general, that effective amount may be as little as 0.2 part by weight, or less, of the stabilizer composition per hundred parts by weight of the halogen-containing polymer. While there is no critical upper limit on the amount of stabilizer composition, amounts in excess of 15 parts by weight per hundred parts by weight of the halogen-containing polymer do not yield a commensurate increase in effectiveness. Preferably, the stabilizer compositions of this invention are employed in amounts ranging from about 1 part to about 7 parts by weight per hundred parts by weight of the halogen-containing polymer.

The polymer composition of this invention may be prepared by methods well known in the art and by the use of conventional equipment. The stabilizer composition may be added to the halogen-containing polymer with continuous blending in a high intensity mixer such as a Henschel blender. The important consideration is that the the stabilizer composition and the halogen-containing polymer be thoroughly blended.

The stabilized halogen-containing polymer compositions of this invention may be used to form articles of manufacture such as pipe. A variety of conventional molding techniques may be employed to form the stabilized compositions into any desired shape.

The following examples illustrate the invention. Unless otherwise indicated, all amounts, parts, and percentages are by weight.

EXAMPLE 1

A mixture of 130 parts of paraffin wax (Hoechst XL-165, 35 parts (0.17 equivalent), 0.2 part of acetic acid, 15 parts of an oxidized polyethylene, and an antifoam agent was heated to 110° C. before 6.82 parts (0.17 equivalent) of zinc oxide was added gradually. This mixture was sparged with a stream of nitrogen at 110° C. for one hour to drive off water from the reaction of the oxide with the sulfhydryl group. Then 61.11 parts (0.2 equivalent) of stearic acid was mixed with the zinc salt/wax solution and 8 parts (0.17 equivalent) of calcium hydroxide was added. This mixture was held at 110° C. for 0.5 hour and, upon pouring one-half of it into a shallow pan, it was noted that it poured easily like water and solidified upon cooling. This was fraction A of Example 1. To the remainder there was added about 0.4 part of the substituted dihydropyridine referred to hereinabove as DHP-1 and the mixture was heated for a further 0.5 hour before it was poured into a shallow pan for solidification. This was fraction B of Example 1.

EXAMPLE 2

Paraffin wax (69.36 parts) was heated to 110° C. and 0.1 part of glacial acetic acid and 3.8 parts (0.093 equivalent) of zinc oxide were added. The mixture was held there for 0.5 hour before twenty parts (0.098 equivalent) of 2-ethylhexylthioglycolate were added. The reaction mixture was held at 110° C. for 45 minutes. The liquid had a very low viscosity, somewhat like water, when it was poured into a shallow pan.

EXAMPLE 3

The general procedure of Example 2 was followed except that methane sulfonic acid was used instead of acetic acid as the initiator. After panning, the product solidified upon cooling.

EXAMPLES 4 and 5

In these examples, a PVC composition suitable for the fabrication of pipe is prepared by blending 100 parts of poly vinylchloride (OXY 225 PG), 5 parts of a coated calcium carbonate (Omya FT), 1 part of titanium oxide (TiPure R960, Dupont), and 0.3 part of calcium hydroxide (all of which is referred to hereinbelow as the Base PVC Formulation) with 2.5 parts of fraction A of Example 1 and 0.3 part of DHP-1 to give the product of Example 4 and with 2.8 parts of fraction B of Example 1 to give the product of Example 5. The blending was accomplished with the use of a Henschel high intensity mixer at temperatures up to about 110° C. Dynamic Mill Performance testing of a Control composition and of the products of Examples 5 and 6 was conducted by masticating the cooled blends on a two roll mill at 390° F. The roll speed for the front roll was 30 rpm and for the back roll it was 40 rpm. Samples of the fused composition were taken every minute. Colorimetry tests of the samples gave the results shown in Table I. The Control was a blend of the Base PVC Formulation with 1.3 parts of paraffin wax, 0.6 part of calcium stearate, 0.15 part of the oxidized polyethylene, 0.4 part of a separately prepared zinc 2-ethylhexylthioglycolate, and 0.3 part of the DHP-1, blended in the same manner as the stabilized polymer compositions of this invention.

TABLE I

| Example No. | | 1 | 2 | 3 | 4 | MINUTES 5 | 6 | 7 | 8 |
|---|---|---|---|---|---|---|---|---|---|
| Control | L | 91.1 | 91.3 | 91.0 | 91.0 | 90.7 | 85.0 | 61.6 | |
| | a | 0.0 | −0.5 | −0.9 | −1.4 | −1.8 | −2.4 | −3.0 | |
| | b | 2.4 | 3.0 | 3.6 | 4.7 | 6.5 | 17.9 | 17.6 | |
| | WI | 70.5 | 67.5 | 64.3 | 58.3 | 48.6 | −14.9 | −24.1 | |
| | YI | 4.7 | 5.6 | 6.2 | 8.2 | 11.3 | 35.7 | 47.5 | |
| | dE | 3.0 | 3.3 | 3.9 | 5.0 | 6.8 | 19.5 | 35.8 | |
| 4 | L | 90.7 | 91.4 | 90.8 | 90.7 | 90.8 | 90.4 | 88.8 | 70.9 |
| | a | 0.1 | −0.3 | −0.8 | −1.5 | −1.9 | −2.1 | −2.5 | −2.8 |
| | b | 2.0 | 2.4 | 3.5 | 5.7 | 6.5 | 7.1 | 11.5 | 19.2 |
| | WI | 71.7 | 71.1 | 64.3 | 52.6 | 48.7 | 44.7 | 20.4 | −27.5 |
| | YI | 4.1 | 4.5 | 6.3 | 10.0 | 11.4 | 12.5 | 21.2 | 45.5 |
| | dE | 3.0 | 2.8 | 4.0 | 6.0 | 6.8 | 7.5 | 12.2 | 29.1 |
| 5 | L | 91.2 | 91.2 | 90.9 | 91.0 | 90.9 | 90.5 | 89.2 | 73.0 |
| | a | −0.0 | −0.4 | −1.1 | −1.9 | −2.5 | −2.5 | −2.6 | −2.2 |
| | b | 2.2 | 2.8 | 4.3 | 6.6 | 7.7 | 7.8 | 10.8 | 19.8 |
| | WI | 71.5 | 68.8 | 60.4 | 48.4 | 42.6 | 41.5 | 24.5 | −29.4 |
| | YI | 4.3 | 5.1 | 7.6 | 11.4 | 13.2 | 13.5 | 19.5 | 46.4 |
| | dE | 2.8 | 3.2 | 4.6 | 6.8 | 8.0 | 8.2 | 11.4 | 28.0 |

The fusion time, minimum torque, and maximum torque of the fused products of Examples 4 and 5 during a Brabender test were also compared with those of the Control. The test conditions were: 190° C. temperature, 76 grams weight, and 60 rpm rotor speed. The results are given in Table II.

TABLE II

| Example No. | Fusion Time (min.) | Minimum Torque (g · m) | Maximum Torque (g · m) |
|---|---|---|---|
| Control | 1.5 | 1700 | 2800 |
| 4 | 1.0 | 1675 | 2975 |
| 5 | 1.1 | 1700 | 2950 |

EXAMPLES 6 and 7

In these examples, a Base Lubricated PVC Formulation containing 100 parts of poly vinylchloride (Shintech SE-950), 5 parts of a coated calcium carbonate (Omya FT), 1 part of titanium oxide (TiPure R960, Dupont), 0.4 part of calcium stearate, 0.3 part of calcium hydroxide, 0.3 part of DHP-1, and 0.15 part of oxidized polyethylene was blended with 0.4 part of a separately prepared zinc 2-ethylhexylthioglycolate and 1.2 parts of paraffin wax to make a Control composition. The same Base Lubricated PVC Formulation was also blended with 1.6 parts of the zinc 2-ethylhexylthioglycolate of Example 2 to give the stabilized polymer composition of Example 6 and with the zinc 2-ethylhexylthioglycolate of Example 3 to give the stabilized polymer composition of Example 7. Blending was performed in substantially the same manner as in Examples 4 and 5. Each of these blends were tested according the Dynamic Mill Performance Test procedure described in Examples 4 and 5. The colorimeter results are given in Table III.

TABLE III

| Example No. | | 1 | 2 | 3 | 4 | MINUTES 5 | 6 | 7 | 8 |
|---|---|---|---|---|---|---|---|---|---|
| Control | L | 91.0 | 91.2 | 90.8 | 90.5 | 90.0 | 89.0 | 77.8 | 57.9 |
| | a | 0.2 | −0.5 | −0.9 | −1.3 | −1.8 | −2.1 | −2.1 | −3.5 |
| | b | 1.2 | 1.9 | 2.6 | 3.6 | 5.2 | 7.6 | 18.8 | 15.9 |
| | WI | 76.5 | 73.3 | 69.1 | 63.3 | 54.4 | 40.8 | −23.2 | −19.0 |
| | YI | 2.5 | 3.3 | 4.4 | 6.1 | 8.8 | 13.5 | 41.2 | 44.6 |
| | dE | 2.4 | 2.4 | 3.2 | 4.2 | 5.8 | 8.4 | 24.0 | 38.4 |
| 6 | L | 90.6 | 90.5 | 90.8 | 90.7 | 89.8 | 87.4 | 67.3 | |
| | a | 0.2 | −0.4 | −0.7 | −1.1 | −1.8 | −2.1 | −2.7 | |
| | b | 1.0 | 1.7 | 2.2 | 3.1 | 5.2 | 10.6 | 18.7 | |
| | WI | 76.9 | 73.2 | 71.0 | 66.1 | 54.1 | 23.4 | −26.7 | |
| | YI | 2.2 | 3.0 | 3.8 | 5.2 | 8.9 | 20.0 | 46.8 | |
| | dE | 2.7 | 2.9 | 2.9 | 3.7 | 5.9 | 11.9 | 31.6 | |
| 7 | L | 91.6 | 91.0 | 91.0 | 90.8 | 90.7 | 90.2 | 83.1 | 61.8 |
| | a | 0.2 | −0.6 | −1.0 | −1.5 | −1.9 | −2.1 | −2.5 | −3.4 |
| | b | 1.2 | 2.0 | 2.8 | 3.9 | 5.2 | 6.7 | 17.4 | 17.1 |
| | WI | 77.9 | 72.1 | 68.3 | 62.2 | 55.3 | 46.9 | −13.6 | −22.2 |
| | YI | 2.4 | 3.5 | 4.7 | 6.5 | 8.7 | 11.6 | 35.3 | 45.5 |
| | dE | 2.0 | 2.7 | 3.2 | 4.3 | 5.6 | 7.2 | 19.9 | 35.4 |

We claim:

1. A method for the preparation of a zinc mercaptoester comprising heating a mixture of zinc oxide, a mercaptoester having the formula HS-[CH$_2$C(=O)OR]$_x$—(CH$_2$)$_y$—C(=O) OR] wherein R is a straight or branched chain saturated or unsaturated alkyl radical having from 1 to 20 carbon atoms, x=0 or 1, y=1 or 2, and y=1 when x=1, and paraffin wax to a temperature at least equal to the melting range of the wax, and removing water as it forms.

2. A method for making a stabilizer composition for halogen-containing polymers comprising heating a mixture of zinc oxide, a mercaptoester having the formula HS-[CH$_2$C(=O)OR]$_x$—(CH$_2$)$_y$—C(=O)OR] wherein R is a straight or branched chain saturated or unsaturated alkyl radical having from 1 to 20 carbon atoms, x=0 or 1, y=1 or 2, and y=1 when x=1, and paraffin wax to a temperature at least equal to the melting range of the wax, removing water as it forms, adding calcium hydroxide and stearing acid and heating the resulting mixture to remove water.

3. The method of claim 2 wherein the mercaptoester has the formula:

$$HS-[CH_2C(=O)OR]_x(CH_2)_y-C(=O)OR$$

wherein R is a straight or branched chain saturated or unsaturated alkyl radical having from 1 to 20 carbon atoms, x=0 or 1, y=1 or 2, and y =1 when x=1.

4. A heat stabilizer composition consisting essentially of a paraffin wax, calcium stearate, and a zinc mercaptoester made by reacting zinc oxide with a mercaptoester having the formula $HS-[CH_2C(=O)OR]_x-(CH_2)_y-C(=O)OR]$ wherein R is a straight or branched chain saturated or unsaturated alkyl radical having from 1 to 20 carbon atoms, x=0 or 1, y=1 or 2, and y=1 when x=1 in the paraffin wax matrix.

5. The heat stabilizer composition of claim 4 wherein calcium stearate is prepared in the zinc mercaptoester/paraffin wax matrix from calcium hydroxide and stearic acid.

6. A polymer composition comprising a halogen-containing polymer and the heat stabilizer of claim 4.

* * * * *

UNITED STATES PATENT AND TRADEMARK OFFICE
CERTIFICATE OF CORRECTION

PATENT NO. : 5,332,772
DATED : July 26, 1994
INVENTOR(S) : Beekman, et. al.

It is certified that error appears in the above-indentified patent and that said Letters Patent is hereby corrected as shown below:

Column 4, line 33, change "pollnner" to --polymer--;

Column 9, line 1, change "stearing" to --stearic--;

Signed and Sealed this

First Day of November, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,332,772
DATED : July 26, 1994
INVENTOR(S) : Beekman et al.

It is certified that error appears in the above-indentified patent and that said Letters Patent is hereby corrected as shown below:

Column 4, line 50, after the word "the", insert --stabilizer composition, the polymer composition of this invention--

Column 5, lines 17-18, delete "the method of this invention also includes the addition of the";

Signed and Sealed this

Twenty-eight Day of February, 1995

Attest:

BRUCE LEHMAN

Attesting Officer        Commissioner of Patents and Trademarks